(12) United States Patent
Caliaro et al.

(10) Patent No.: US 9,487,993 B2
(45) Date of Patent: Nov. 8, 2016

(54) SPACER FOR A VACUUM GLAZING PANEL, CORRESPONDING VACUUM GLAZING PANEL AND PRODUCTION PROCESS

(75) Inventors: Sebastien Caliaro, Jumet (BE); Francois Closset, Jumet (BE); Florence Scheyvaerts, Jumet (BE)

(73) Assignee: AGC Glass Europe, Brussels (BE)

(*) Notice: Subject to any disclaimer, the term of this patent is extended or adjusted under 35 U.S.C. 154(b) by 901 days.

(21) Appl. No.: 13/643,191

(22) PCT Filed: May 17, 2011

(86) PCT No.: PCT/EP2011/057918
§ 371 (c)(1),
(2), (4) Date: Oct. 24, 2012

(87) PCT Pub. No.: WO2011/144588
PCT Pub. Date: Nov. 24, 2011

(65) Prior Publication Data
US 2013/0040079 A1    Feb. 14, 2013

(30) Foreign Application Priority Data

May 18, 2010   (BE) .................................. 2010/0297

(51) Int. Cl.
*E06B 3/663* (2006.01)
*E06B 3/66* (2006.01)

(52) U.S. Cl.
CPC ............ *E06B 3/66309* (2013.01); *E06B 3/663* (2013.01); *E06B 3/6612* (2013.01); *E06B 3/66304* (2013.01); *E06B 3/66333* (2013.01); *Y02B 80/22* (2013.01); *Y02B 80/24* (2013.01); *Y10T 428/12* (2015.01)

(58) Field of Classification Search
CPC .............. Y10T 428/12229; Y10T 428/12243; Y10T 428/12333; E06B 3/66304; E06B 3/663; E06B 3/6612; E06B 3/66333; Y02B 80/22; Y02B 80/24
See application file for complete search history.

(56) References Cited

U.S. PATENT DOCUMENTS

| 2,909,814 | A | | 10/1959 | Schwartz |
| 4,295,900 | A | * | 10/1981 | Malmgren ............. C22C 38/40 148/325 |
| 2002/0064610 | A1 | | 5/2002 | Misonou |
| 2005/0138892 | A1 | | 6/2005 | Misonou |

FOREIGN PATENT DOCUMENTS

| CA | 2 299 349 | 12/1999 |
| EP | 0 831 073 | 3/1998 |

(Continued)

OTHER PUBLICATIONS

International Search Report Issued Oct. 7, 2011 in PCT/EP11//57918 Filed May 17, 2011.

*Primary Examiner* — Donald J Loney
(74) *Attorney, Agent, or Firm* — Oblon, McClelland, Maier & Neustadt, L.L.P.

(57) ABSTRACT

The invention relates to a spacer (8) to be sandwiched between first and second glass sheets (5) of a vacuum glazing panel, such as to maintain a first space between the glass sheets, which space forms a first cavity (4) under a vacuum of less than 1 mbar, a sealing joint (1) being positioned on the periphery of the glass sheets enclosing the first cavity. According to the invention, one such spacer (8) comprises cold-worked austenitic stainless steel.

15 Claims, 2 Drawing Sheets

(56) References Cited

FOREIGN PATENT DOCUMENTS

| | | |
|---|---|---|
| EP | 1 018 493 | 7/2000 |
| EP | 1 195 496 | 4/2002 |
| EP | 1 506 945 | 2/2005 |
| FR | 2 701 474 | 8/1994 |
| JP | 5 123808 | 5/1993 |
| JP | 7 214226 | 8/1995 |
| JP | 9 268035 | 10/1997 |
| JP | 2675765 | 11/1997 |
| JP | 2000 54746 | 2/2000 |
| JP | 2002 114540 | 4/2002 |
| JP | 2003 321255 | 11/2003 |

* cited by examiner

SPACER FOR A VACUUM GLAZING PANEL, CORRESPONDING VACUUM GLAZING PANEL AND PRODUCTION PROCESS

1. FIELD OF THE INVENTION

The field of the invention is that of multiple insulating glazing systems and more specifically vacuum glazing systems. The invention relates more specifically to spacers for a vacuum glazing panel.

2. SOLUTIONS OF THE PRIOR ART

A vacuum glazing panel is typically composed of at least two glass sheets separated by a space, in which a vacuum has been created. Such a glazing is classically used for its high thermal insulation properties. The thickness of the space under vacuum is typically 80 µm to 800 µm order to achieve high insulation performances, the pressure in the interior of the glazing must be in the order of $10^{-3}$ mbar. To obtain such a pressure in the interior of the glazing, a seal is positioned on the periphery of the two glass sheets and the vacuum is created in the interior of the glazing by means of a pump. In order to prevent the glazing from collapsing under atmospheric pressure (as a result of the pressure difference between the interior and the exterior of the glazing), spacers are placed at regular intervals (for example, in the form of a matrix) between the two glass panels.

The spacers, referred to as pillars, are generally cylindrical or spherical in form. Nowadays, these spacers are generally metallic and therefore create heat losses in the glazing panel. In order to maintain a heat transmission coefficient U of less than 0.6 W/m²K, the total surface of the spacers in contact with the glass must represent less than 1% of the surface of the vacuum glazing panel.

Moreover, the spacers must have an adequate compressive strength so that they are not deformed when the insulating glazing panel is placed under vacuum and thus so that the space between the two glass sheets and the contact zone between the spacer and the glass sheets are kept constant. The required compressive strength depends on the proportion of the surface of the glass occupied by the spacers (e.g. the compressive strength must be at least equal to 11 MPa in the case where spacers cover 1% of the surface of the glazing). The compressive strength of metals is defined in standard ASTM E9-09 ("Standard test methods of compression testing of metallic materials at room temperature").

Patent EP 831073 B1 describes a range of spacers made from a stainless steel material having a compressive strength of at least 491 MPa and in the form of cylindrical columns of about 0.5 mm in diameter and about 0.2 mm(+/−0.01 mm) in height. These spacers are spaced about 25 to 40 mm close to the edges of the glazing and about 20 mm elsewhere.

During the course of the production process of the vacuum glazing the spacers must be placed and held in vertical position until the glazing is in compressed state (when the vacuum has been created in the glazing). The spacing board is held in a good position solely because of the compressive force caused by atmospheric pressure.

However, it has been observed that the spherical or cylindrical spacers have a tendency to shift during production of the vacuum glazing panel and in particular when being placed under vacuum.

Consequently, it has been proposed to utilise C-shaped spacers made of $Ni_{20} CR_{80}$ that have a better stability and are less inclined to shift during production of the glazing panel.

This material has a compressive strength of about 700 MPa. This strength allows a vacuum glazing such as described above to be used.

However, the choice of a material with a high compressive strength makes it more difficult to shape small spacers. More specifically, the production of a wire with a diameter of less than 200 µm will generally be more difficult than in the case of a steel of lower strength.

Moreover, materials with a high compressive strength such as Inconel 718 or $Ni_{80}CR_{20}$ are more costly than steels with an iron base (and this is the case essentially because of their high nickel content).

3. OBJECTIVES OF THE INVENTION

The objective of the invention in particular is to remedy these disadvantages of the prior art.

More specifically, an objective of the invention in at least one of its embodiments is to provide a spacer for a vacuum glazing panel that has a higher compressive strength than classic spacers.

Another objective of the invention in at least one of its embodiments is to provide such a spacer that allows vacuum glazing panels to be obtained that have good performance in terms of heat transmission coefficient and in terms of aesthetics.

Another objective of the invention in at least one of its embodiments is to provide such a spacer that makes the production of the vacuum glazing easier.

Another objective of the invention in at least one of its embodiments is to provide such a spacer that has a better stability and that is less inclined to shift during production of the vacuum glazing panel.

Another objective of the invention in at least one of its embodiments is to provide such a spacer that is simple to shape.

Another objective of the invention in at least one of its embodiments is to provide such a spacer that is less costly.

4. DISCLOSURE OF THE INVENTION

In accordance with a particular embodiment, the invention relates to a spacer intended to be sandwiched between the first and second glass sheets of a vacuum glazing panel in order to maintain between these glass sheets a first space that forms a first cavity, in which a vacuum of less than 1 mbar prevails, wherein a seal positioned on the periphery of the glass sheets closes the first cavity.

According to the invention such a spacer consists of a strain-hardened austenitic stainless steel. In the following, "strain-hardened" is understood to mean the result of a strain hardening step of said steel resulting in an increase in the compressive strength of said steel during production of the spacer that is greater than 50% of its initial compressive strength.

Austenitic stainless steels are Fe—Cr—Ni alloys containing more than 50% by weight of iron, more than 11% by weight of chromium (e.g. between 16% and 19% by weight) and less than 20% by weight of nickel (e.g. between 6% and 9.5% by weight).

The general principle of the invention rests on utilising an austenitic steel to form a vacuum glazing panel spacer. In fact, the initial microstructure of austenitic stainless steels, which thus contain the residual austenite, gives them a favourable deformability. Hence, such a spacer is relatively malleable so long as it is not strain-hardened, and this facilitates the shaping of this spacer and then, once strain-hardened, it becomes very resistant to compression.

In fact, on application of a treatment with the aim of strain hardening austenitic stainless steel, this austenitic stainless steel is highly strain-hardened and can thus achieve a very high compressive strength. The strength of this austenitic stainless steel is preferably further reinforced because of the transformation of the unstable austenite into martensite that is harder under the effect of the treatment. The importance of this transformation and of the hardening that it causes is dependent on the stability of the austenitic phase and therefore on the composition. The less stable the austenitic phase is, the more marked the tendency of this hardening effect becomes. Since nickel has a tendency to stabilise this austenitic phase, this property is more pronounced for compounds with a low nickel content (Ni less than 20% by weight). The increase in the strength of the material (by strain hardening and possibly phase transformation) can be controlled during the production of the spacer (type of production process, temperature, deformation rate . . .) in order to give the spacer the compressive strength required for a vacuum glazing in a given configuration.

The strength of an austenitic stainless steel can easily double as a result of the treatment leading to strain hardening. For example, in the case of shaping, e.g. by drawing, to obtain a spacer that is cylindrical in cross-section (shaping therefore leading to strain hardening of the steel: the strain hardening thus takes place during shaping), an 80% reduction in cross-section of the wire causes an increase in the strength of AISI 301 (American Iron and Steel Institute 301) stainless steel to more than 1400 MPa (its initial strength being 620 MPa).

Thus, a spacer with a higher compressive strength than classic spacers is obtained with such an austenitic stainless steel. Thus, for the same pressure value in the vacuum glazing panel it is possible to significantly reduce the surface of the spacers in contact with the two vacuum glazing panels, and therefore reduce the dimensions of the spacers and thus reduce their surface in contact with the glass or decrease their density in the glazing panel in relation to classic spacers. Thus, better performance in terms of heat transmission coefficient and in terms of aesthetics is obtained than with classic spacers.

Moreover, since, when not strain-hardened, austenitic stainless steels are relatively malleable compared to the materials classically chosen for spacers (for their high compressive strength properties), shaping of the spacers according to the invention is conducted in an easier manner, which makes the production of the entire vacuum glazing simpler and less costly.

Moreover, austenitic stainless steels that are essentially based on iron are less costly than steels with a high compressive strength such as Inconel 718 or $Ni_{80}CR_{20}$ (which are more costly essentially because of their high nickel content).

Advantageously, said austenitic steel is one of the following stainless steels:

AISI 301 (American Iron and Steel Institute 301)
AISI 302 (American Iron and Steel Institute 302).

The spacer preferably comprises a portion of a wire with a cylindrical cross-section obtained by drawing said austenitic steel.

Thus, in this mode of use of the invention the strain hardening (necessary to obtain a high compressive strength) of the austenitic steel of the spacer takes place during production of the spacer and, more specifically, during a step of shaping the spacer. Shaping is preferably a shaping at a cold or tepid temperature (production temperatures that do not cause complete recrystallisation of the alloy, in the opposite case it would lose its properties acquired during cold shaping). Therefore, this temperature can be adjusted for each type of production process and each type of alloy. For example, in the case of AISI 301 and 302 steels standard EN10270_3 states that the maximum temperature of use to avoid complete recrystallisation of the alloy is 250° C.

The wire preferably has a diameter in the range of between 50 μm and 300 μm and preferably between 100 μm and 300 μm.

Advantageously, the length of said portion of wire is in the range of between 0.5 mm and 5 mm.

Said portion of wire is preferably bent on at least one of its sections in order to form a loop section with a maximum radius of curvature in the range of between 0.1 mm and 1 mm.

Such a spacer thus has a better stability and is less inclined to shift during production of the vacuum glazing panel than cylindrical or spherical spacers. Handling and positioning of the spacer in the vacuum glazing panel is thus facilitated.

The portion of wire is preferably a segment of a circle with a radius of curvature in the range of between 0.1 mm and 1 mm.

The invention also relates to a vacuum glazing panel comprising at least first and second glass sheets separated by a first space forming a first cavity, in which a vacuum of less than 1 mbar prevails, wherein a seal positioned on the periphery of the glass sheets closes off the first cavity, the panel additionally comprising a plurality of spacers as described above, wherein the spacers are sandwiched between the first and second glass sheets in order to maintain said first space.

Advantageously, the spacers are arranged between the first and second glass sheets in order to form a matrix, in which the spacing is in the range of between 20 and 80 mm and preferably in the range of between 30 and 60 mm.

The vacuum glazing panel preferably additionally comprises a thermal insulation layer arranged on an inside surface of at least one of the glass sheets.

The vacuum glazing panel preferably additionally comprises a third glass sheet separated from one of the first and second glass sheets by a second space forming a second cavity and a second seal positioned on the periphery of the third glass sheet and one of the first and second glass sheets in order to maintain the second space, wherein said second cavity is filled with at least one gas.

Naturally, according to the invention the second cavity can also be under vacuum.

The invention also relates to a process for producing a spacer intended to be sandwiched between the first and second glass sheets of a vacuum glazing panel in order to maintain between these glass sheets a first space forming a first cavity, in which a vacuum of less than 1 mbar prevails, wherein a seal positioned on the periphery of the glass sheets closes the first cavity wherein the process comprises the following steps:
obtaining an austenitic stainless steel;
shaping the austenitic stainless steel to form said spacer;
strain hardening said austenitic steel.

Said step of shaping the austenitic stainless steel preferably comprises the following steps:
obtaining a wire of cylindrical cross-section by drawing said austenitic stainless steel;
cutting out at least one portion of the wire to form said spacer, and said strain hardening step is combined with the shaping step.

Thus, the process for the production of the spacer according to the invention is easier and more economical because it is not necessary to implement a strain hardening operation separate from the shaping operation.

Naturally, according to the invention the strain hardening of the austenitic stainless steel can be achieved outside any shaping operation by means of a specific treatment, e.g. by applying a significant pressure to the steel. In this case, the process for the production of the spacer can include no shaping step. However, if there is a shaping operation, this can take place before or after the strain hardening treatment.

Advantageously, said shaping step of the austenitic stainless steel additionally comprises a step of bending the portion of wire on at least one of its sections in order to form a loop section with a maximum radius of curvature in the range of between 0.1 mm and 1 mm.

5. LIST OF FIGURES

Other features and advantages of the invention will become clearer upon reading the following description of a preferred embodiment, given as a simple non-restrictive illustrative example, and the attached drawings, wherein.

6. DESCRIPTION OF AN EMBODIMENT OF THE INVENTION

Figure 1:
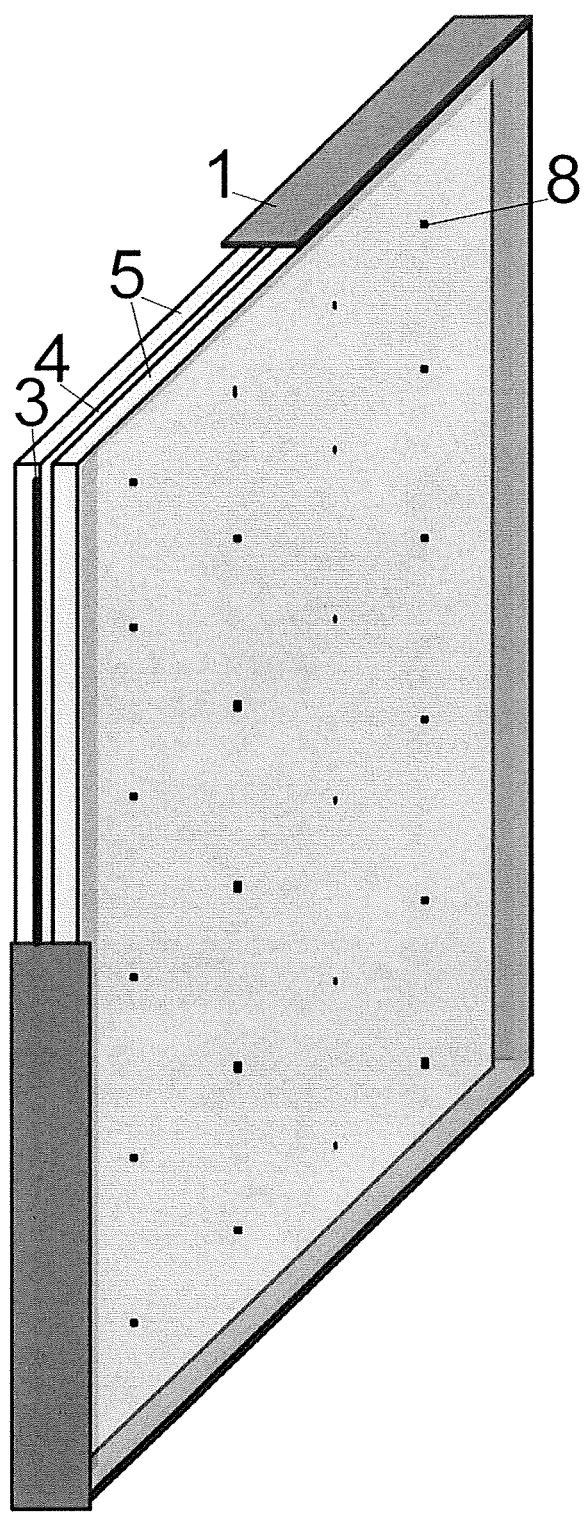
FIGS. 1 and 2 show a diagram of a vacuum glazing panel according to an embodiment of the invention.

The present invention shall be described with reference to particular embodiments and with reference to some drawings. However, the invention is not restricted by this and is only restricted by the claims. In the drawings the size and relative dimensions of some elements may be exaggerated and may not be drawn to scale for illustrative reasons.

Moreover, the terms first, second, third and the like in the description and in the claims are used to distinguish between similar elements and not necessarily to describe any sequence, whether in time, space or for classification or other purposes. It is to be understood that the terms used in this way are interchangeable in the appropriate circumstances and that the embodiments of the invention described here can be implemented in other sequences than those described or illustrated here.

Moreover, the terms high, low, above, below and the like in the description and in the claims are used for descriptive reasons and not necessarily to describe relative positions. It is to be understood that the terms used in this way are interchangeable in the appropriate circumstances and that the embodiments of the invention described here can be implemented in other orientations than those described or illustrated here.

It should be noted that the term "comprising" used in the claims should not be interpreted as being restricted to the means listed thereafter; it does not exclude other elements or steps. It should therefore be interpreted as specifying the presence of the elements specified, units, steps or components referred to, but does not exclude the presence or addition of an element, unit, step or component, or group thereof. Hence, the range of the expression "a device comprising means A and B" must not be limited to devices consisting solely of components A and B. This means that with respect to the present invention the only relevant components of the device are A and B.

"Seal" as used here and unless indicated otherwise is understood to mean the seal with respect to any gas that could be used in a double glazing unit to improve insulation (e.g. argon) or the seal with respect to the air or any other gas present in the atmosphere (in the case of a vacuum glazing).

"Thermal insulation layer" as used here and unless indicated otherwise is understood to mean a metal oxide layer having an emissivity of less than 0.2, preferably less than 0.1 and more preferred less than 0.05. A thermal insulation layer can be one of the following layers, for example: Planibel G, Planibel top N and Pop N+ supplied by AGC.

The term "spacer" as used here and unless indicated otherwise relates to one or more elements that assure a relatively constant distance between two adjacent glass panels.

Figure 2:
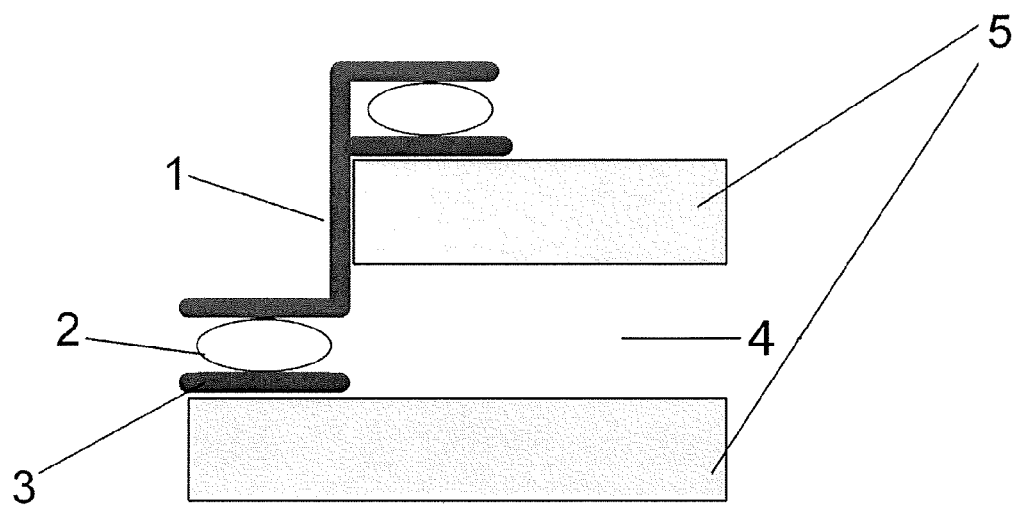

A vacuum glazing panel according to an embodiment of the invention is explained in relation to FIGS. 1 and 2.

The vacuum glazing panel comprises first and second glass sheets 5 (e.g. 6 mm thick sheets of clear soda-lime-silica glass) separated by a first space forming a first cavity 4, in which a vacuum of less than 1 mbar prevails, e.g. equal to $10^{-3}$ mbar (obtained by pumping in the cavity by means of a vacuum pump).

It is understood that any other type of glass and thickness of glass can be used.

The two glass sheets 5 are assembled in a gastight manner (assuring the vacuum) by means of a seal positioned on the periphery of the glass sheets 5 closing the first cavity 4.

For example, the seal comprises:

adhesion layers 3 covering a peripheral zone of each of the first and second glass sheets 5, a metal strip 1 welded to the adhesion layers 3 by welds 2 (e.g. formed by means of a tin soldering joint).

For example, the adhesive material forming the adhesion layers 3 can be selected from the group consisting of copper and its alloys (e.g. with titanium and/or chromium), aluminium and its alloys, iron and its alloys (such as Fe—Ni austenitic steels: e.g. iron (50-55% by weight, e.g. 52% by weight), nickel (45-50% by weight, e.g. 48% by weight) such as alloy 48), iron alloys containing the following metals: iron (53-55% by weight, e.g. 53.5% by weight), nickel (28-30% by weight, e.g. 29% by weight) and cobalt (16-18% by weight, e.g. 17% by weight) and Kovar®), platinum and its alloys, nickel and its alloys, gold and its alloys, silver and its alloys, gallium arsenide and tin and its alloys. This list is not exhaustive.

It is understood that the seal can be made in any other way, e.g. by means of two metal strips welded to the glass sheets and also welded to one another or even by means of a glass weld.

The vacuum glazing panel also comprises a plurality of spacers 8 according to the invention, wherein the spacers are sandwiched between the first and second glass sheets 5 in order to maintain the first space between these glass sheets 5.

For example, the spacers are arranged between the first and second glass sheets in order to form a matrix, the spacing of which is in the range of between 20 and 80 mm and preferably between 30 and 60 mm.

In order to further improve performance in terms of thermal insulation, a thermal insulation layer can be arranged on the inside surface of at least one of the glass sheets 5.

It is understood that according to variants of the above-mentioned embodiment that are not illustrated, the glazing panel can additionally comprise a third glass sheet separated from any one of the first and second glass sheets (e.g. from the second glass sheet) by a second space in order to form a second cavity. According to a first variant, a second seal is additionally positioned on the periphery of the third and second glass sheets in order to maintain the second space (e.g. with a thickness of 16 mm), wherein said second cavity is filled with at least one gas. The gas can be, for example, air, argon, nitrogen, krypton, xenon, SF6, $CO_2$ or any other thermal insulating gas. According to a second variant, the third and second glass sheets are assembled to be gastight (assuring the vacuum) by means of a seal positioned on the periphery of the glass sheets closing the second cavity and a plurality of spacers according to the invention are sandwiched between the third and second glass sheets in order to maintain the second space between these glass sheets. A vacuum triple glazing is thus obtained.

Other variants are, of course, conceivable in particular replacing a glass sheet with a laminated glass panel or any other addition or modification.

Figure 3:
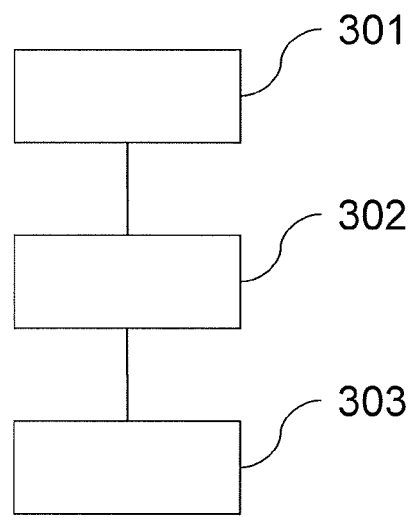
FIG. 3 shows a process for the production of a spacer according to an embodiment of the invention.

A process for the production of a spacer according to an embodiment of the invention is explained in relation to FIG. 3.

The production process comprises the following steps:
a step 301 of obtaining an austenitic stainless steel;
a step 302 of shaping the austenitic stainless steel to shape said spacer;
a step 303 of strain hardening said austenitic stainless steel.

The spacer can be of different shapes such as cylindrical, spherical, of wire in an hourglass shape, a cross shape.

The following lies within the framework of an example according to the invention, in which the spacer is made from AISI 301 steel and is C-shaped.

Step 302 of shaping the austenitic steel firstly comprises a step of obtaining a wire of cylindrical cross-section by drawing. Naturally, the step of obtaining the wire can also be conducted by hot extrusion of said AISI 301 steel, then drawing it in order to obtain the final diameter of the wire.

For example, starting with a wire with a diameter of 5 mm, on which a drawing operation is conducted, a fine wire having a diameter of 1 mm is obtained (this representing an 80% reduction in cross-section of the wire).

Step 302 of shaping the austenitic steel then comprises a step of cutting out at least one portion of wire (by means of cutting nippers, for example) to form said spacer. The length of said portion of wire is 4 mm, for example.

According to an advantageous embodiment, step 302 of shaping the austenitic steel then comprises a step of bending said portion of wire on at least one of its sections in order to form a loop section with a maximum radius of curvature of 0.5 mm.

The bending step can, of course, be conducted before the cutting step.

The portion of wire is preferably a segment of a circle with a radius of curvature of 0.5 mm.

Thus, within the framework of this second example the step of strain hardening 303 is combined with the drawing step.

Thus, during the drawing operation an 80% reduction in cross-section of the wire causes an increase in the strength of the AISI 301 stainless steel of 620 MPa to 1400 MPa.

For example, if spacers of non-strain-hardened AISI 301 (i.e. that have a compressive strength of 620 MPa) are used, which have a contact surface equivalent to a disc with a radius of 250 μm and a spacing of 30 mm between them, a vacuum glazing panel with a coefficient U equal to 0.8 $W/(m^2K)$ is obtained.

In contrast, by using the abovementioned spacers according to the invention (of strain-hardened AISI 301 in a C shape) that have a compressive strength of 1400 MPa, it is possible to reduce the number of spacers by moving them 50 mm apart, improving the U value to about 0.5 $W/(m^2K)$.

The U values of vacuum glazing systems are estimated on the basis of a glazing described above that include a low-emissivity type of layer. The heat transmissions (U values) were evaluated using the method described in the publication of the University of Sydney: Determination of the Overall Heat Transmission Coefficient (U-Value) of Vacuum Glazing, T. M. Simko, A H. Elmandy and R. E. Collins, Ashrae Transactions, 105, pt 2, pp 1-9, 1999.

It is understood that the invention is not restricted to the abovementioned embodiment.

The invention claimed is:

1. A spacer, comprising:
strain-hardened austenitic stainless steel,
wherein,
the spacer is sandwiched between a first glass sheet and a second glass sheet of a vacuum glazing panel, thereby maintaining a first space forming a first cavity between the first and second glass sheets,
the first cavity is suitable for a vacuum of less than 1 mbar, and
the first cavity is closed with a seal on a periphery of the first and second glass sheets, and
a compressive strength of the strain hardened austenitic stainless steel is increased by more than 50% compared with its initial compressive strength before strain hardening.

2. The spacer of claim 1, wherein the austenitic steel is AISI 301 or AISI 302.

3. The spacer of claim 1, comprising:
a portion of a wire of cylindrical cross-section, obtained by a process comprising drawing the austenitic stainless steel.

4. The spacer of claim 3, wherein a diameter of the wire is between 50 μm and 300 μm.

5. The spacer of claim 3, wherein a length of the portion of the wire is between 0.5 mm and 5 mm.

6. The spacer of claim 3, wherein the portion of the wire is bent on a section, thereby forming a loop section with a maximum radius of curvature of between 0.1 mm and 1 mm.

7. The spacer of claim 6, wherein the portion of the wire is a segment of a circle with a radius of curvature of between 0.1 mm and 1 mm.

8. A vacuum glazing panel, comprising:
a first glass sheet,
a second glass sheet,
a first space forming a first cavity, separating the first and second glass sheets,
a seal on a periphery of the first and second glass sheets, closing the first cavity, and
a plurality of the spacers of claim 1 between the first and second glass sheets,
wherein the first space forming the first cavity is suitable for a vacuum of less than 1 mbar, and
the spacers are suitable for maintaining the first space.

9. The vacuum glazing panel of claim 8,
wherein the spacers form a matrix between the first and second glass sheets and a spacing of the spacers in the matrix is between 20 mm and 80 mm.

10. The vacuum glazing panel of claim 8, further comprising:
a thermal insulation layer on an inside surface of the first glass sheet, the second glass sheet, or both.

11. The vacuum glazing panel of claim 8, further comprising:
a third glass sheet,
a second space forming a second cavity between the third glass sheet and either the first glass sheet or the second glass sheet, and
a second seal on a periphery of the third glass sheet and either the first glass sheet or the second glass sheet, thereby maintaining the second space,
wherein the second cavity comprises a gas.

12. The spacer of claim 4, wherein the diameter of the wire is between 100 μm and 200 μm.

13. The vacuum glazing panel of claim 9, wherein the spacing of the spacers in the matrix is between 30 and 60 mm.

14. The vacuum glazing panel of claim 10, wherein the thermal insulation layer comprises a metal oxide layer.

15. The vacuum glazing panel of claim 10, wherein the thermal insulation layer has an emissivity of less than 0.2.

* * * * *